(12) United States Patent
Uwabo et al.

(10) Patent No.: US 6,285,529 B1
(45) Date of Patent: Sep. 4, 2001

(54) FLEXIBLE DISK LINER ARRANGEMENT CAPABLE OF PREVENTING THE INGRESS OF DUST

(75) Inventors: Tsuneo Uwabo, Hachiouji; Yoshihiro Okano; Eiichi Yoneyama, both of Atsugi; Yoshinori Tangi, Hachiouji, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/294,821

(22) Filed: Apr. 19, 1999

(51) Int. Cl.[7] .................................................. G11B 23/03
(52) U.S. Cl. ............................................................. 360/133
(58) Field of Search ................................................ 360/133

(56) References Cited

U.S. PATENT DOCUMENTS 5,793,583 * 8/1998 Oishi ..................................... 360/133
5,923,510 * 7/1999 Oishi ..................................... 360/133
6,021,031 * 2/2000 Hales et al. .......................... 360/133

FOREIGN PATENT DOCUMENTS 11-45540 * 2/1999 (JP) .

* cited by examiner

Primary Examiner—Jefferson Evans
(74) Attorney, Agent, or Firm—Frishauf, Holtz, Goodman, Langer & Chick, P.C.

(57) ABSTRACT

A flexible disk 10 includes a magnetic recording medium 13, upper and lower jackets 11 and 15 enclosing the magnetic recording medium so that the magnetic recording medium is rotatable, and upper and lower liners 12 and 14 attached to inner surfaces of the upper and the lower jackets, respectively. The magnetic recording medium is provided with a rotation supporting hub 18 attached to a center portion thereof. The lower jacket is provided with an opening 15a to expose the hub on its outer surface. The lower liner 14 has an inner peripheral portion 14a extended to a gap 15b between the hub and an edge of the opening to thereby prevent the ingress of the dust through the gap.

7 Claims, 3 Drawing Sheets

FLEXIBLE DISK LINER ARRANGEMENT CAPABLE OF PREVENTING THE INGRESS OF DUST

BACKGROUND OF THE INVENTION

This invention relates to a flexible disk in which a magnetic recording medium for recording and reproducing data is enclosed within a jacket.

A flexible disk of the type comprises a generally disk-shaped sheet-like magnetic recording medium and a jacket enclosing the magnetic recording medium so that the magnetic recording medium is rotatable. The magnetic recording medium comprises a flexible sheet made of synthetic resin or the like. A magnetic recording layer is formed on a surface of the sheet and a coating layer is formed on the magnetic recording layer. The magnetic recording medium is attached to a hub which makes the magnetic recording medium rotatable. In order to record or reproduce data in and from the flexible disk, the flexible disk is loaded in a disk drive. The disk drive comprises a rotation driving mechanism for rotating the magnetic recording medium, and a magnetic head for access to the magnetic recording medium being rotated. In the disk drive, the magnetic head is moved in a radial direction of the magnetic recording medium with respect to the magnetic recording medium being rotated and is brought into sliding contact with the surface of the magnetic recording medium. Through the magnetic head, data is written in the magnetic recording medium and data recorded in the magnetic recording medium is read from the magnetic recording medium.

In the flexible disk of the type, it is required to form an opening in the jacket in order to bring the magnetic head into sliding contact with the surface of the magnetic recording medium. In addition, another opening is required to expose the hub on an outer surface of the jacket. Therefore, the magnetic recording medium can not be sealed within the jacket. This implies that, when the flexible disk is reserved or used, dust readily enters through the openings into the jacket to be adhered onto the magnetic recording medium. Such dust sometimes makes it impossible for the magnetic head to normally read or write data from or into the magnetic recording medium. In other words, if dust is adhered onto the magnetic recording medium, an error may occur in access by the magnetic head.

With a demand for an increase in memory capacity, development has been made of a flexible disk having a very large memory capacity as compared with that having a normal memory capacity. For example, the normal memory capacity is on the order between 1 M and 2 Mbytes. In contrast, a flexible disk having a memory capacity on the order between 100 and 130 Mbytes has been recently put into practical use. In case of the flexible disk having such a large capacity, a reading error or a writing error due to the presence of dust tends to occur. tends to occur.

SUMMARY OF THE INVENTION

It is therefore an object of this invention to provide a flexible disk capable of preventing the ingress of dust through a gap between a rotation supporting hub and an opening of a jacket.

A flexible disk according to this invention comprises a generally disk-shaped sheet-like magnetic recording medium, a jacket enclosing the magnetic recording medium so that the magnetic recording medium is rotatable, and a generally annular liner attached to an inner surface of the jacket. The magnetic recording medium is provided with a rotation supporting hub attached to a center portion thereof. The jacket is provided with an opening to expose the hub on its outer surface.

According to an aspect of this invention, the liner has an inner peripheral portion extended to a gap between the hub and an edge of the opening to thereby prevent the ingress of dust through the gap.

DESCRIPTION OF THE PREFERRED EMBODIMENTS

Figure 1:
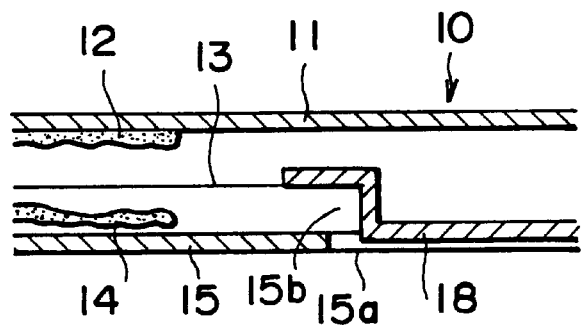
FIG. 1 is a partial sectional view for describing a conventional flexible disk.
Figure 2:
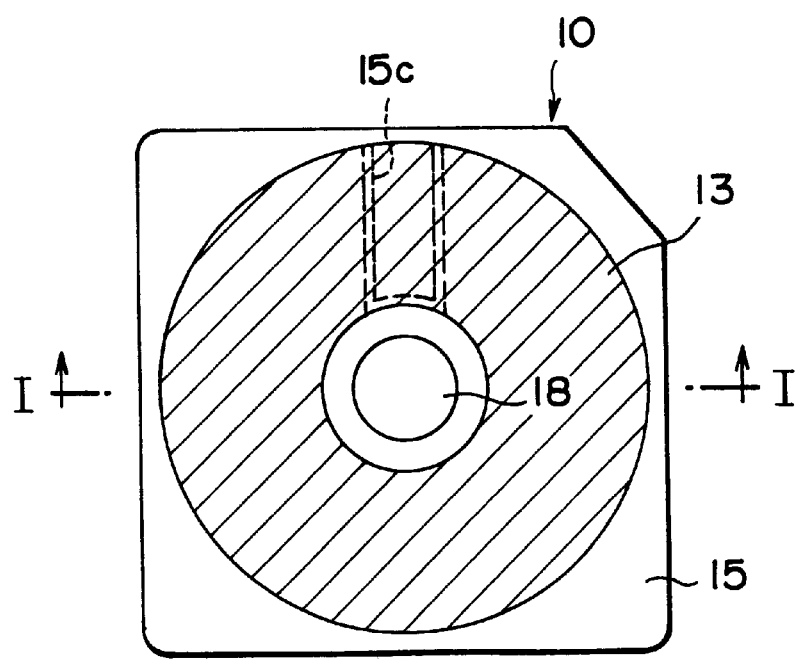
FIG. 2 is a sectional view for describing a flexible disk according to a first embodiment of this invention.
Figure 3:
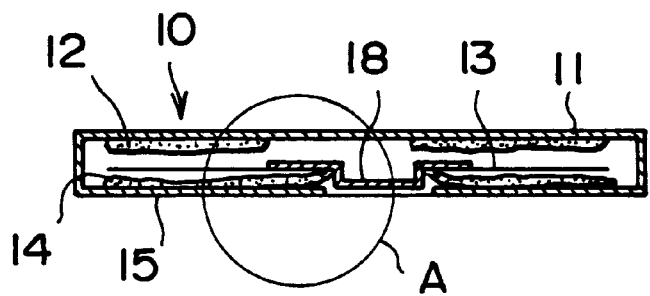
FIG. 3 is a sectional view taken along a line I—I in FIG. 2.

Referring to FIG. 1, description will be made about the structure of a conventional flexible disk in order to facilitate an understanding of this invention. In FIG. 1, the flexible disk 10 comprises an upper jacket 11 and a lower jacket 15. The upper and the lower jackets 11 and 15 are provided with generally annular upper and lower liners 12 and 14 arranged on inner surfaces thereof, respectively. The upper liner 12 and the lower liner 14 are sheet-like members made of nonwoven fabric or the like and serve to remove the dust on a generally disk-shaped magnetic recording medium 13. A rotation supporting hub 18 is attached to a center portion of the magnetic recording medium 13. The lower jacket 15 is provided with an opening 15a to expose the hub 18 on its outer surface.

In the above-mentioned flexible disk 10, a gap 15b is formed between the hub 18 and an edge of the opening 15a of the lower jacket 15. Through the gap, a small amount of dust may enter into the interior of the flexible disk 10 to be adhered to the magnetic recording medium 13. If the dust is adhered to the magnetic recording medium 13, a reading or a writing error may be caused to occur, particularly when the flexible disk has a large capacity.

Referring to FIGS. 2 through 5, description will be made about a flexible disk according to a first embodiment of this invention. In FIGS. 2 through 5, similar parts are designated by like reference numerals as those in FIG. 1. The flexible disk 10 comprises an upper jacket 11, a lower jacket 15, an upper liner 12, a lower liner 14, and a magnetic recording medium 13. A hub 18 made of a metal is attached to a center portion of the magnetic recording medium 13 to rotatably support the magnetic recording medium.

The upper and the lower jackets 11 and 15 are made of synthetic resin or the like and are integrally coupled to form a case for enclosing the magnetic recording medium 13. The lower jacket 15 is provided with an opening 15c to allow sliding contact of a magnetic head, which is not illustrated in the figure, in a state where the flexible disk 10 is loaded in a disk drive. Likewise, an opening (hereinafter referred to as an opening 11c although not illustrated in the figure) similar to the opening 15c is formed in the upper jacket 11 at a position corresponding to the opening 15c. The lower jacket 15 is provided with an opening 15a formed at a center portion thereof to expose the hub 18. The magnetic recording medium 13 comprises a generally disk-shaped flexible sheet made of synthetic resin or the like. A magnetic recording layer is formed on a surface of the sheet and a coating layer is formed on the magnetic recording layer. As well known, the flexible disk 10 has a sliding shutter (not shown). When the flexible disk 10 is not used, the openings 11c and 15c are closed by the shutter.

Each of the upper and the lower liners 12 and 14 is formed by a nonwoven fabric sheet, for example, made of rayon. In this embodiment, the upper and the lower liners 12 and 14 are fixed by welding or adhesion to inner surfaces of the upper and the lower jackets 11 and 15, respectively, in a region (except those regions corresponding to the openings 11c and 15c) corresponding to the magnetic recording medium 13.

The rotation supporting hub 18 is a dish-like member made of a rigid material such as a metal. The hub 18 has an outer peripheral portion fixedly attached to the magnetic recording medium 13. The hub 18 is provided with a hole (not shown) formed at a center portion thereof to receive a rotation shaft for driving the rotation of the magnetic recording medium 13.

Figure 4:
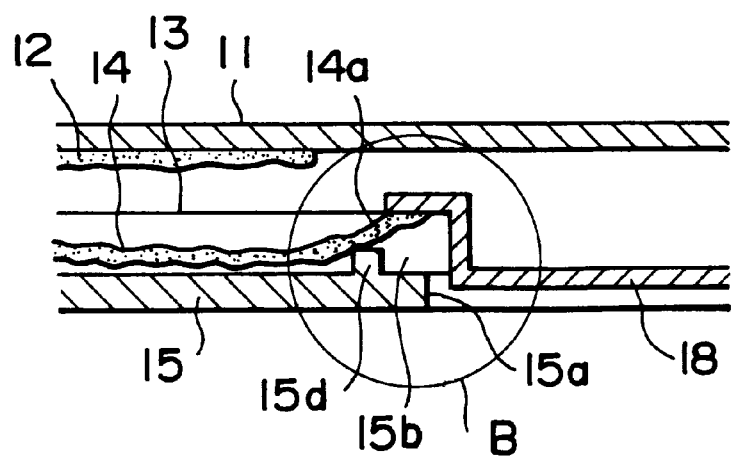
FIG. 4 is an enlarged view of a part A in FIG. 3.
Figure 5:
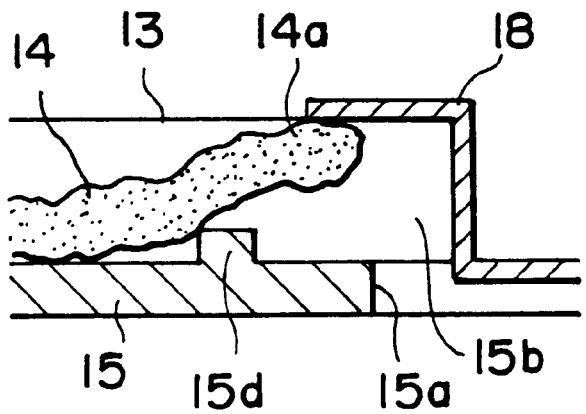
FIG. 5 is an enlarged view of a part B in FIG. 4.

In this embodiment, the lower liner 14 has an inner peripheral portion 14a extended to a gap 15b between the hub 18 and an edge of the opening 15a of the lower jacket 15, as illustrated in FIG. 4. In particular, in the vicinity of the edge of the opening 15a of the lower jacket 15, a protruding portion 15d is formed along the edge of the opening 15a. The inner peripheral portion 14a of the lower liner 14 extends over the protruding portion 15d to reach the gap 15b. The protruding portion 15d is formed in order to raise the inner peripheral portion 14a of the lower liner 14 from the inner surface of the lower jacket 15. By raising the inner peripheral portion 14a from the inner surface of the lower jacket 15, it is possible to bring an end of the inner peripheral portion 14a into contact with the hub 18. The protruding portion 15d may be implemented by an annular protruding portion or a plurality of projections spaced from one another in a circumferential direction.

In the flexible disk 10 according to this embodiment, the inner peripheral portion 14a of the lower liner 14 is extended to the gap 15b between the hub 18 and the edge of the opening 15a of the lower jacket 15. As a result, the gap 15b is closed by the inner peripheral portion 14a to thereby prevent the ingress of the dust through the gap 15b. In addition, since the protruding portion 15d is formed on the lower jacket 15, the inner peripheral portion 14a is bent towards the magnetic recording medium 13 by the presence of the protruding portion 15d to be brought into contact with the magnetic recording medium 13 or the surface of the hub 18. As a result, the ingress of the dust through gap 15b is more reliably prevented.

Figure 6:
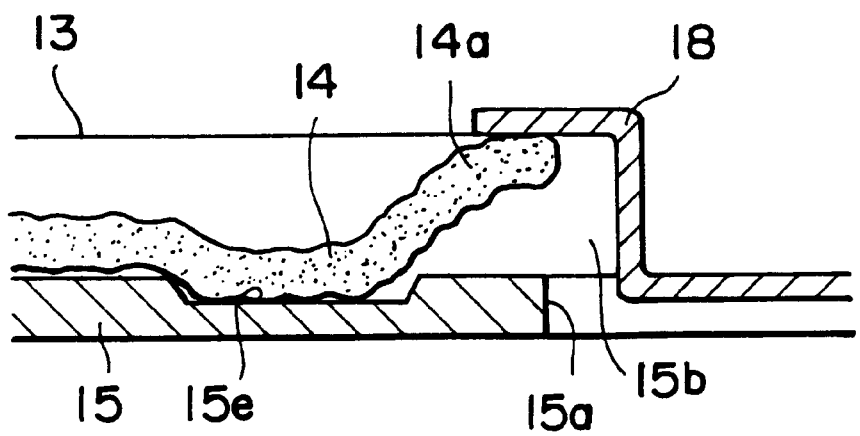
FIG. 6 is an enlarged partial sectional view for describing a flexible disk according to a second embodiment of this invention.

Referring to FIG. 6, description will be made about a second embodiment of this invention. In this embodiment, a recessed portion 15e is formed in the vicinity of the edge of the opening 15a of the lower jacket 15 to extend along the edge. The inner peripheral portion 14a of the lower liner 14 is fixedly attached to the recessed portion 15e. Like the protruding portion 15d in the first embodiment, the recessed portion 15e may be implemented by an annular recessed portion or a plurality of recesses spaced from one another in the circumferential direction. As a technique of fixedly attaching the inner peripheral portion 14a to the recessed portion 15e, use can be made of an appropriate method such as welding or adhesion.

In the flexible disk 10 according to this embodiment, the inner peripheral portion 14a of the lower liner 14 is fixedly attached to the recessed portion 15e. Therefore, as in the first embodiment, the inner peripheral portion 14a is bent towards the magnetic recording medium 13 to be brought into contact with the magnetic recording medium 13 or the surface of the hub 18. As a result, the ingress of dust through the gap 15b is more reliably prevented.

What is claimed is:

1. A flexible disk comprising:

a generally disk-shaped sheet-like magnetic recording medium;

a rotation supporting hub attached to a center portion of said magnetic recording medium;

a jacket enclosing said magnetic recording medium in a manner such that said magnetic recording medium is rotatable on said rotation supporting hub; and a generally annular liner attached to an inner surface of said jacket, wherein said jacket is provided with an opening to expose said rotation supporting hub, and a protruding portion is formed on an inner surface of said jacket in a vicinity of an edge of said opening;

wherein an inner peripheral portion of said liner extends over said protruding portion toward said rotation supporting hub such that a free end of said inner peripheral portion extends past said protruding portion toward said rotation supporting hub and such that said free end of said liner contacts an outer peripheral portion of said rotation supporting hub and closes a gap between said rotation supporting hub and the edge of said opening in said jacket to thereby prevent ingress of dust through said gap; and wherein said protruding portion comprises a plurality of projections spaced apart from one another in a circumferential direction and extending from and around the inner surface of said jacket in the vicinity of the edge of said opening in said jacket.

2. The flexible disk according to claim 1, wherein said protruding portion comprises an annular projection extending from and around the inner surface of said jacket in the vicinity of the edge of said opening in said jacket.

3. The flexible disk according to claim 1, wherein said liner is made of a non-woven fabric sheet.

4. The flexible disk according to claim 1, wherein said free end of said liner contacts said outer peripheral portion of said rotation supporting hub with a portion of said magnetic recording medium therebetween.

5. A flexible disk comprising:

a generally disk-shaped sheet-like magnetic recording medium;

a rotation supporting hub attached to a center portion of said magnetic recording medium;

a jacket enclosing said magnetic recording medium in a manner such that said magnetic recording medium is rotatable on said rotation supporting hub; and a generally annular liner attached to an inner surface of said jacket, wherein said jacket is provided with an opening to expose said rotation supporting hub, and a recessed portion is formed in an inner surface of said jacket in a vicinity of an edge of said opening and extends around said opening; and wherein an inner peripheral portion of said liner is fixedly attached to said recessed portion such that a free end of said inner peripheral portion of said liner extends past said recessed portion and extends toward and contacts an outer peripheral portion of said rotation supporting hub and closes a gap between said rotation supporting hub and the edge of said opening in said jacket to thereby prevent ingress of dust through said gap.

6. The flexible disk according to claim 5, wherein said liner is made of a non-woven fabric sheet.

7. The flexible disk according to claim 5, wherein said free end of said liner contacts said outer peripheral portion of said rotation supporting hub with a portion of said magnetic recording medium therebetween.

* * * * *